(12) United States Patent
Keller et al.

(10) Patent No.: US 7,752,355 B2
(45) Date of Patent: Jul. 6, 2010

(54) ASYNCHRONOUS PACKET BASED DUAL PORT LINK LIST HEADER AND DATA CREDIT MANAGEMENT STRUCTURE

(75) Inventors: Emory D. Keller, Jericho, VT (US); Anthony J. Perri, Jericho, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 1193 days.

(21) Appl. No.: 10/832,658

(22) Filed: Apr. 27, 2004

(65) Prior Publication Data
US 2005/0238038 A1 Oct. 27, 2005

(51) Int. Cl.
*G06F 5/00* (2006.01)
(52) U.S. Cl. ...................................... 710/52
(58) Field of Classification Search .................. 710/52; 711/104
See application file for complete search history.

(56) References Cited

U.S. PATENT DOCUMENTS

| | | | |
|---|---|---|---|
| 4,899,352 A * | 2/1990 | Cucchi et al. ............... | 375/372 |
| 5,828,475 A * | 10/1998 | Bennett et al. ................ | 398/52 |
| 5,893,162 A * | 4/1999 | Lau et al. ..................... | 711/153 |
| 5,898,841 A | 4/1999 | Higgins | |
| 6,032,207 A * | 2/2000 | Wilson ......................... | 710/54 |
| 6,243,778 B1 | 6/2001 | Fung et al. | |
| 6,385,711 B1 | 5/2002 | Colligan | |
| 6,470,730 B1 | 10/2002 | Chamberlain | |
| 6,522,654 B1 | 2/2003 | Small | |
| 6,523,064 B1 | 2/2003 | Akatsu et al. | |
| 6,842,791 B2 * | 1/2005 | Navada et al. ................ | 710/1 |

OTHER PUBLICATIONS

US 6,584,524, 06/2003, Fukunaga et al. (withdrawn)

* cited by examiner

*Primary Examiner*—Henry W. H. Tsai
*Assistant Examiner*—Juanito C Borromeo
(74) *Attorney, Agent, or Firm*—Scully, Scott, Murphy & Presser, P.C.; Steven Capella, Esq.

(57) ABSTRACT

An asynchronous data transfer interface is provided across a boundary that allows high bandwidth data transfers which are packet based as defined by PCI_Express architecture, and has general utility in processor-based applications like servers, desktop applications, and mobile applications. A shared set of multi-port RAM buffers allow both an application layer AL and a transaction layer TL access to a communication protocol layer in a defined process that allows both the application layer AL and the transaction layer TL to read and manage the buffers in a 16 byte boundary in a manner that allows a data credit to be decoupled from a header credit.

2 Claims, 6 Drawing Sheets

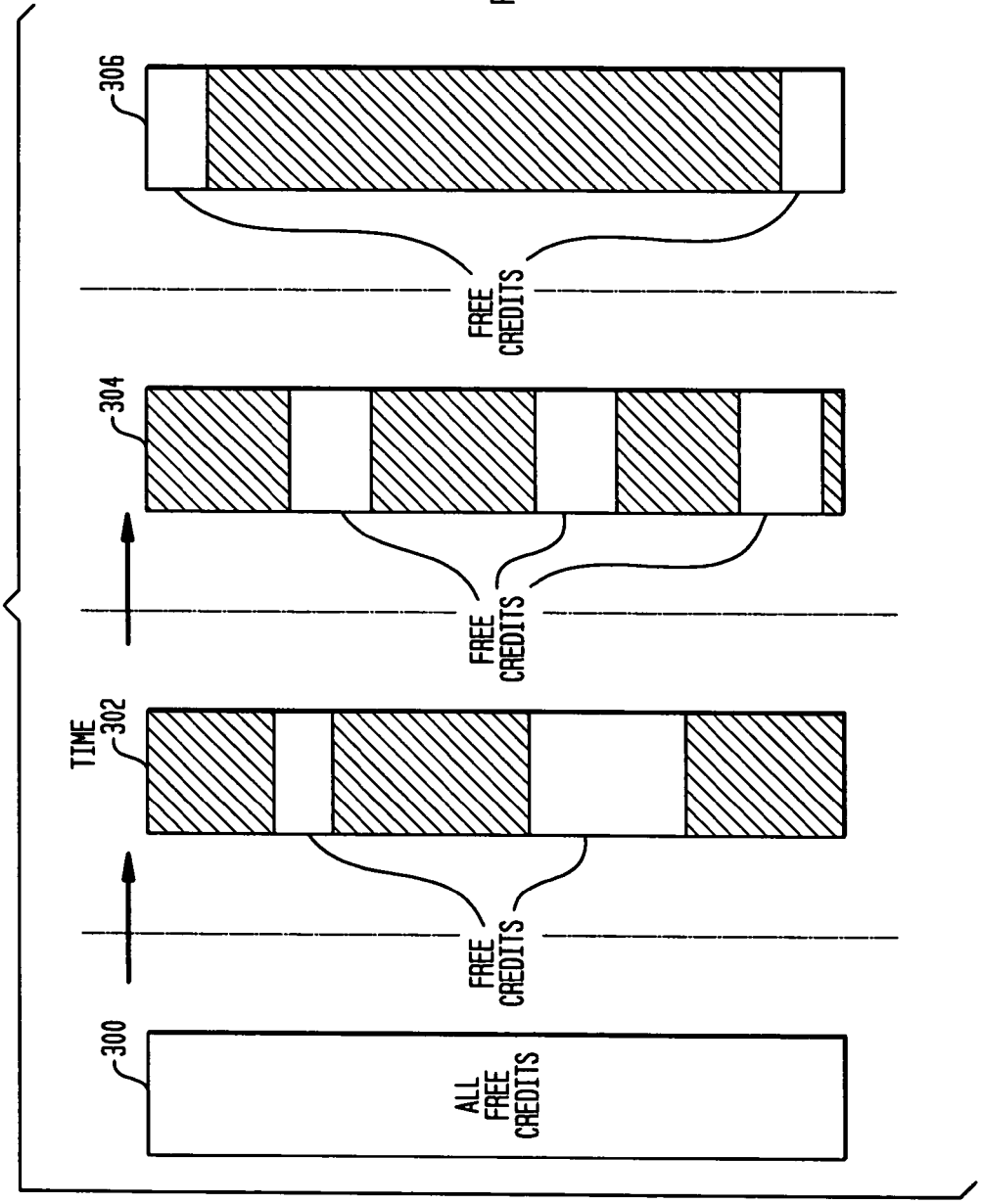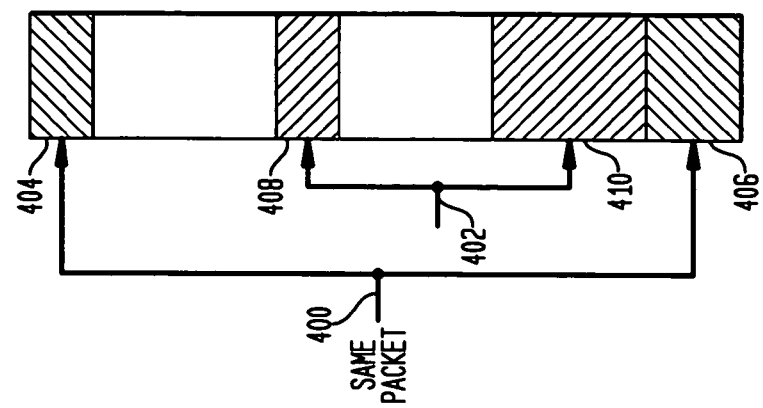

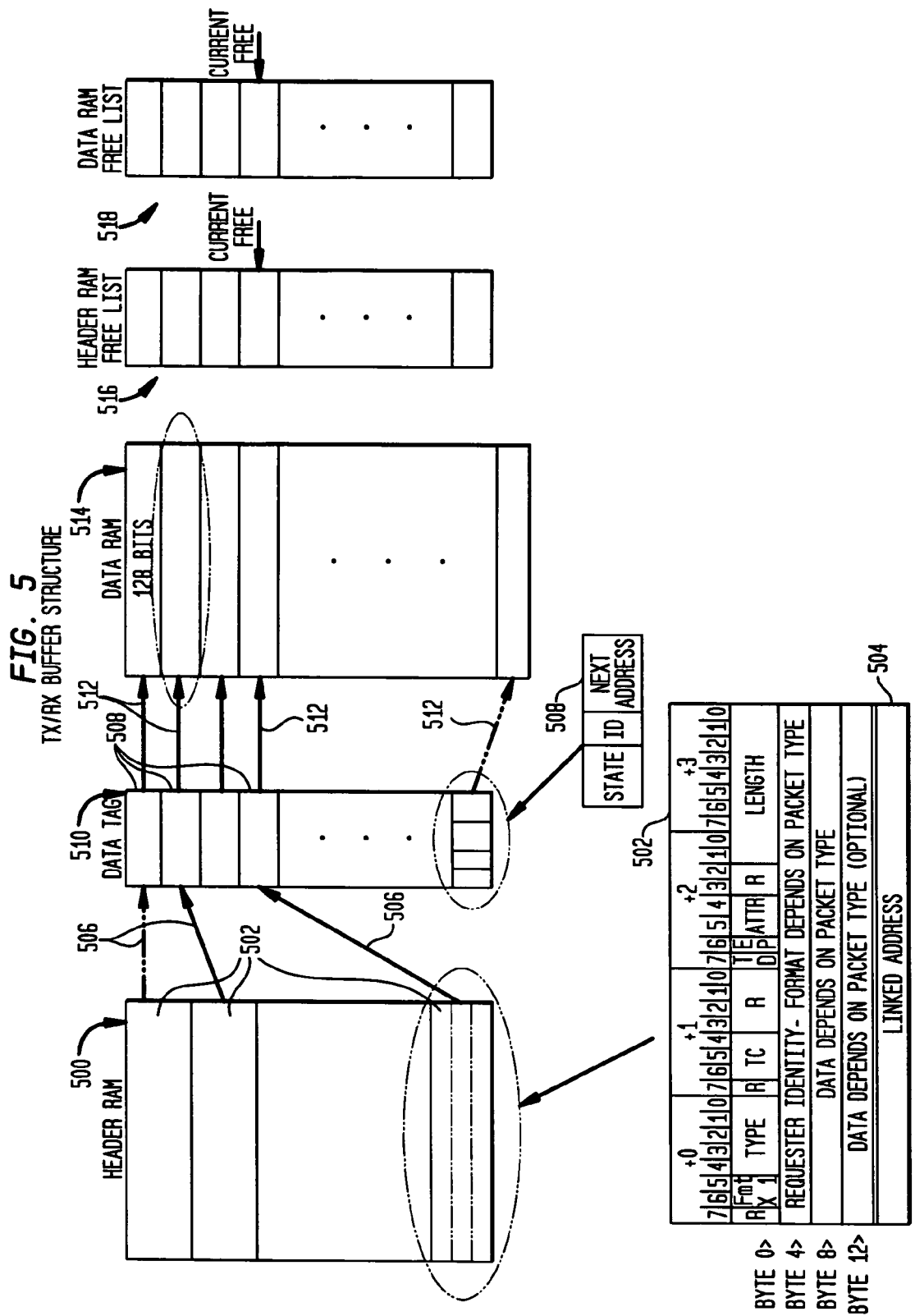

TX AND RX BUFFER STRUCTURE

TX FLOW

RX FLOW

ASYNCHRONOUS PACKET BASED DUAL PORT LINK LIST HEADER AND DATA CREDIT MANAGEMENT STRUCTURE

BACKGROUND OF THE INVENTION

1. Field of the Invention

The present invention relates generally to an asynchronous, packet based, dual port link list header and data credit management structure that functions as an interface for data packet transfers across an asynchronous boundary. The subject invention allows high bandwidth data transfers which are packet based as defined by PCI_Express architecture.

The present invention has general utility in processor-based applications like servers, desktop applications, and mobile applications.

2. Discussion of the Prior Art

Current prior art methods for the transfer of data across an asynchronous boundary involve a bus boundary by using standard asynchronous methods such as using handshaking signals. The prior art generally uses fixed header and data structures, and an application which supports an asynchronous handshake. Such prior art systems implement a fixed data credit protocol without any flexibility to allow an allocation of N integers of Data blocks along with the associated header entries.

SUMMARY OF THE INVENTION

The present invention provides for the transfer of data across an asynchronous boundary, between different systems/layers having different clocks. The invention provides an asynchronous packet based dual port link list header and data credit management structure in which a shared set of dual port RAM data buffers allow both an application layer AL and a transaction layer TL access to the RAM data buffers in a communication protocol layer. The subject invention functions with a defined process that allows both the application layer AL and the transaction layer TL to read and manage the RAM data buffers in a 16 byte boundary in a manner that allows a data credit to be decoupled from a header credit.

The present invention provides for the use of shared memory structures by using a Header RAM, a Data Tag buffer register, a Data RAM, and two memory Free Lists, a first Header RAM Free List that maintains track of the available free memory in the Header RAM, and a second Data RAM Free List that maintains track of the available free memory in the Data RAM. The initiator of a data transfer determines, via the Header Free List and the Data RAM Free List, whether sufficient free memory space is available to support the data transfer. If sufficient free memory space is available, then the initiator of the data transfer writes into a data header in the Header RAM details and information necessary to support the data transfer. The data header has a linked address that provides a link to a Data Tag in the Data Tag buffer register that provides a Next Address (NA) for the first available 128 bits of data space in the Data RAM. If the data transfer requires more than 128 bits of data space, the data transfer continues by using the Data RAM Free List, and the data transfer continues to load the Data Tags and load data into the data addresses in the Data RAM until the all of the data has been transferred into the Data RAM. After the data transfer is completed, the receiver unit is notified, and then the receiver unit reads the data from the Data RAM, using the receiver unit clock which is asynchronous relative to the initiator unit clock. Accordingly, this approach provides for the transfer of data across an asynchronous boundary, between the different systems/layers having different clocks.

BRIEF DESCRIPTION OF THE DRAWINGS

The foregoing objects and advantages of the present invention for an asynchronous packet based dual port link list header and data credit management structure may be more readily understood by one skilled in the art with reference being had to the following detailed description of several embodiments thereof, taken in conjunction with the accompanying drawings wherein like elements are designated by identical reference numerals throughout the several views, and in which:

FIG. 3 illustrates a concept of a moving/changing memory credit window, wherein each of the four separate windows shows blocks of free memory credits, which represent the current amount of available free memory.

FIG. 4 shows that the RX data buffers may distribute the same packet of data at different noncontiguous memory locations when the packet of data is larger than an available single free contiguous memory block.

FIG. 5 illustrates the TX and RX data buffer structures that maintain track of and manage a number of different transfers of packets of data that are being transferred at any one time.

DETAILED DESCRIPTION OF THE INVENTION

The present invention provides an asynchronous interface across a user and core boundary that allows high bandwidth data transfers which are packet based as defined by PCI_Express architecture. The present invention has general utility in processor-based applications like servers, desktop applications, and mobile applications.

In the present invention, a shared set of multi-port RAM buffers allow both an application layer AL and a transaction layer TL access to a communication protocol layer in a defined process that allows both the application layer AL and the transaction layer TL to read/write and manage the buffers in a 16 byte boundary in a manner that allows a data credit to be decoupled from a header credit.

Figure 1:
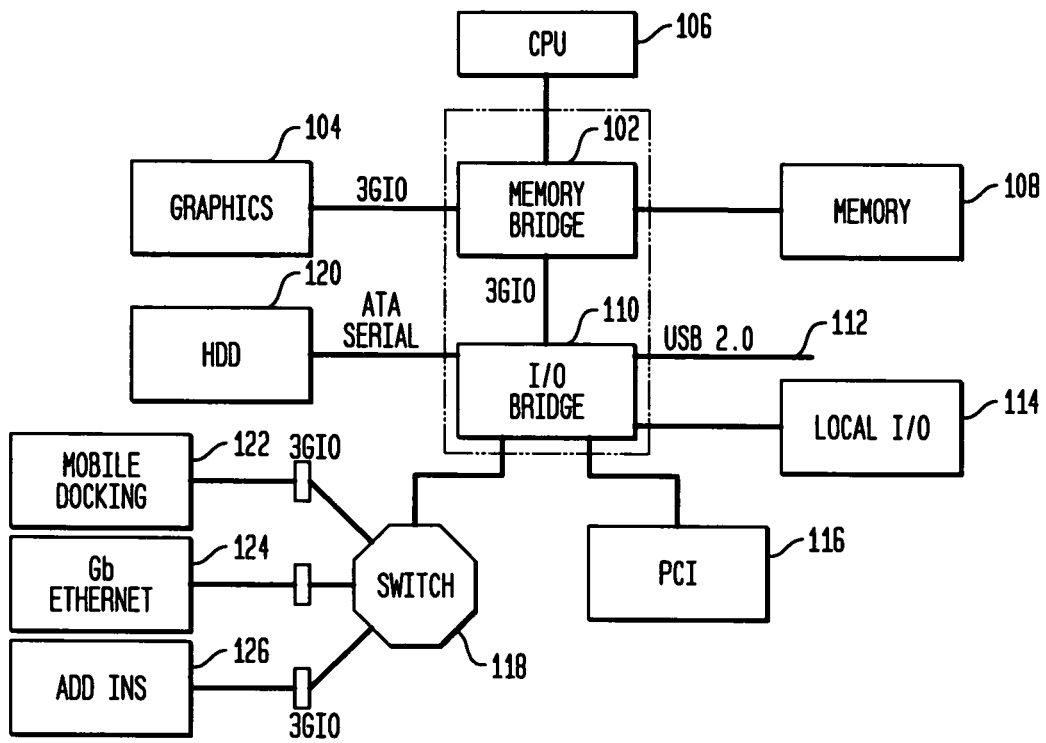
FIG. 1 illustrates an overview of a typical PCI Express System Diagram (also known as a 3GIO (third generation I/O)) desktop or mobile application.

FIG. 1 illustrates an overview of a typical PCI Express (also known as a 3GIO (third generation I/O)) desktop or mobile application that includes a central PCI Express (3GIO) memory bridge 102 accessed by graphics 104, a CPU 106, and a memory 108. The memory bridge 102 accesses a central I/O bridge 110 which is accessed by a USB 2.0 112, a local I/O 114, a PCI 116, a switch 118, and a HDD (hard disc drive) 120. The switch 118 is accessed by mobile docking 122, Gigabit Ethernet 124 and additional interfaces 126.

Figure 2:
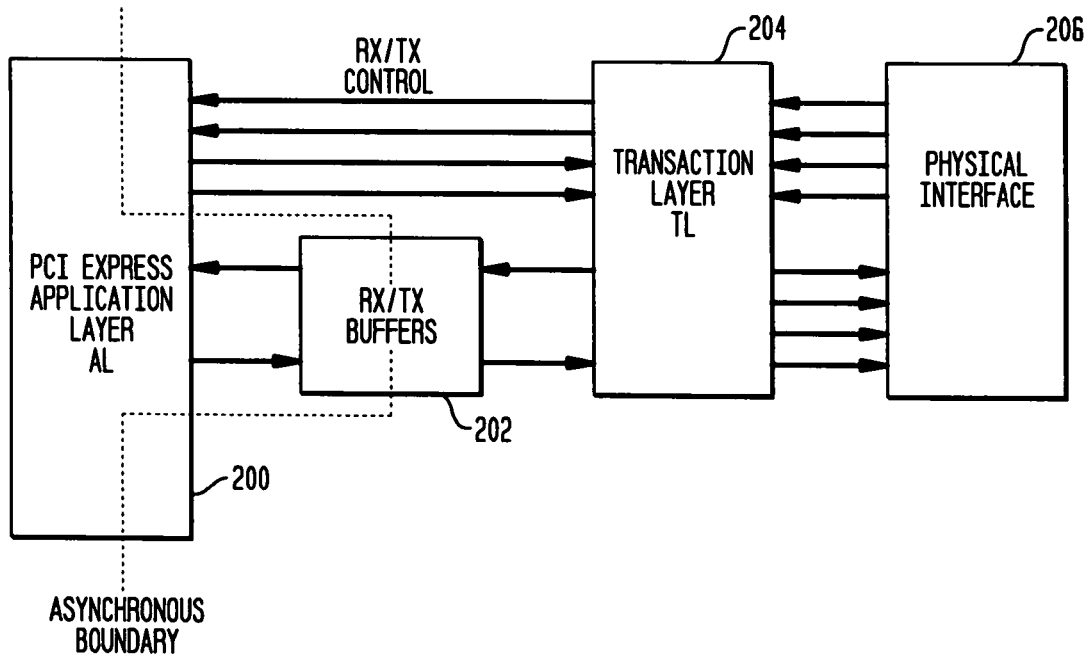
FIG. 2 illustrates a schematic overview of an Application Layer AL communicating by a packet-based protocol through a shared set of multi-port RAM RX (receiver) and TX (transmitter) buffers with a Transaction Layer TL which communicates with a PCI Express physical interface.

FIG. 2 illustrates a schematic overview of an Application Layer AL 200 communicating by a packet-based protocol through a shared set of multi-port RAM RX (receiver) and TX (transmitter) buffers 202, operating pursuant to the present invention, with a Transaction Layer TL 204 which communicates with a PCI Express physical interface 206.

The application layer AL and transaction layer TL communicate by a data packet-based protocol through a shared set of multi-port RAM RX (receiver) and TX (transmitter) buffers 202. The buffer implementation supports a maximum number (e.g. 16) of transactions per virtual channel VC for a transmitter TX and a receiver RX, supports out of order buffers, supports retry functions, provides a 128 bit transaction layer TL and memory interface, and includes dedicated busses for both the header RAM and the Data Tags.

FIG. 3 illustrates the concept of a moving/changing memory credit window, wherein each of the four separate windows shows blocks of free memory credits, which represent the current amount of available free memory, available as blocks of memory at a given granularity of memory locations, at four different instances of time. The free credits represent the amount of memory that is available to be written into, wherein the amount of memory that is available changes over time, as represented by the different windows, being both freed up and used somewhat randomly over time. The left window 300 of FIG. 3 shows a starting time credit window wherein the entire memory is available as free credits, while the credit windows 302, 304, 306 to the right show that the amount of memory that is available changes over time, being both freed up and used somewhat randomly at different times.

FIG. 4 shows that the RX data buffers may distribute the same packet of data 400, 402 at different memory locations 404 and 406, 408 and 410, which are not contiguous when the packet of data is larger, for example 800 bytes, than an available single free contiguous memory block, for example 500 bytes. The receiver RX data buffers are credit based and use a data tag lookup, and will not start to receive a packet of data until there is sufficient memory credit available, meaning that there is sufficient available free memory to store the packet of data at that point in time.

FIG. 5 illustrates the TX and RX data buffer structures that maintain track of and manage a number of different transfers of packets of data that are being transferred at any one time, with one designed embodiment including a maximum number of 8 different transfers of data at one time. The TX and RX data buffer structures support an out of order completion of transfers of packets of data, and function to dynamically allocate memory space in a data RAM 514.

Referring to FIG. 5, in an overview, the present invention provides for the use of shared memory structures by using a Header RAM 500, a Data Tag buffer register 510, a Data RAM 514, and two memory Free Lists, a first Header Free List 516 that maintains track of the available free memory in the Header RAM 500, and a second Data RAM Free List 518 that maintains track of the available free memory in the Data RAM 514.

The initiator of a data transfer (which can be either the application layer AL or the transaction layer TL) determines, via the Header Free List 516 and the Data RAM Free List 518, whether sufficient free memory space is available to support the data transfer. If sufficient free memory space is available, then the initiator of the data transfer writes into a data header 502 in the Header RAM 500 the details and information on the data transfer, such as the length and type of the data transfer, the initiator/source of the data transfer, the receiver of the data transfer, whether an error check should be made for errors, and any special instructions concerning the data transfer. The data header 502 has a linked address 504 that provides a link to a Data Tag 508 in the Data Tag buffer register 510 that provides a Next Address (NA) for the first available 128 bits of data space in the Data RAM 514, and data is loaded/transferred to that address in Data RAM 514. The Data Tag 508 and the Data RAM Free List are then updated.

If the data transfer requires more than 128 bits of data space, the data transfer continues by using the Data RAM Free List 518, and the data transfer continues to load the Data Tags 508, and continues to load data into the data addresses (128 bits of data in each address), until the all of the data has been transferred into the Data RAM 514. After the data transfer is completed, the receiver unit is notified, and then the receiver unit reads the data from the Data RAM 514, etc.

Referring to FIG. 5 in greater detail, the Header RAM 500 that holds data headers 502 which hold data transfer information, with the bottom magnified data header 502 illustrating the fields of an exemplary data header entry. The data header 502 stores details on the data transfer, such as the length and type of the data transfer (e.g. a write or read data transfer), the initiator/source of the data transfer (Requestor identity), the receiver of the data transfer, error messages on whether an error check should be made for errors, and any special instructions concerning the data transfer. The Header RAM 500 also maintains header credits to ensure that sufficient data buffer space exists for the requested data transfer. Each data header includes a Linked Address 504 that functions as a pointer, indicated by an arrow 506, to a Data Tag 508 address of the Data Tag buffer register 510.

Each Data Tag includes a structure to keep track of the location of each packet of data. A magnified Data Tag 508 is illustrated at the bottom and includes a State field, which indicates whether the Data Tag is free or not free (being used), an ID field which is a transaction header ID, and a Next Address NA field, which functions as a pointer, indicated by arrows 512, to an address in a Data RAM 514 of 128 bits (16 bytes) of data, such that each Data Tag points to 128 bits of data.

A Header RAM Free Data List 516 is maintained that is a list of current free data headers in the Header RAM 500 that are currently not being used and are free to write into. Each read operation adds to the Free List, and each write operation subtracts from the Free List.

A Data RAM Free Data List 518 is maintained that is a list of current free data addresses of 128 bits of data in the Data RAM 516 that are currently not being used and are free to write into. Each read operation adds to the Free List, and each write operation subtracts from the Free List.

In the Data Tag lookup and usage, the application layer AL sets the State for a TX, and the transaction layer TL sets the State for a RX. The transaction layer TL clears the State for a TX, and the application layer AL clears the State for a RX.

Figure 6:
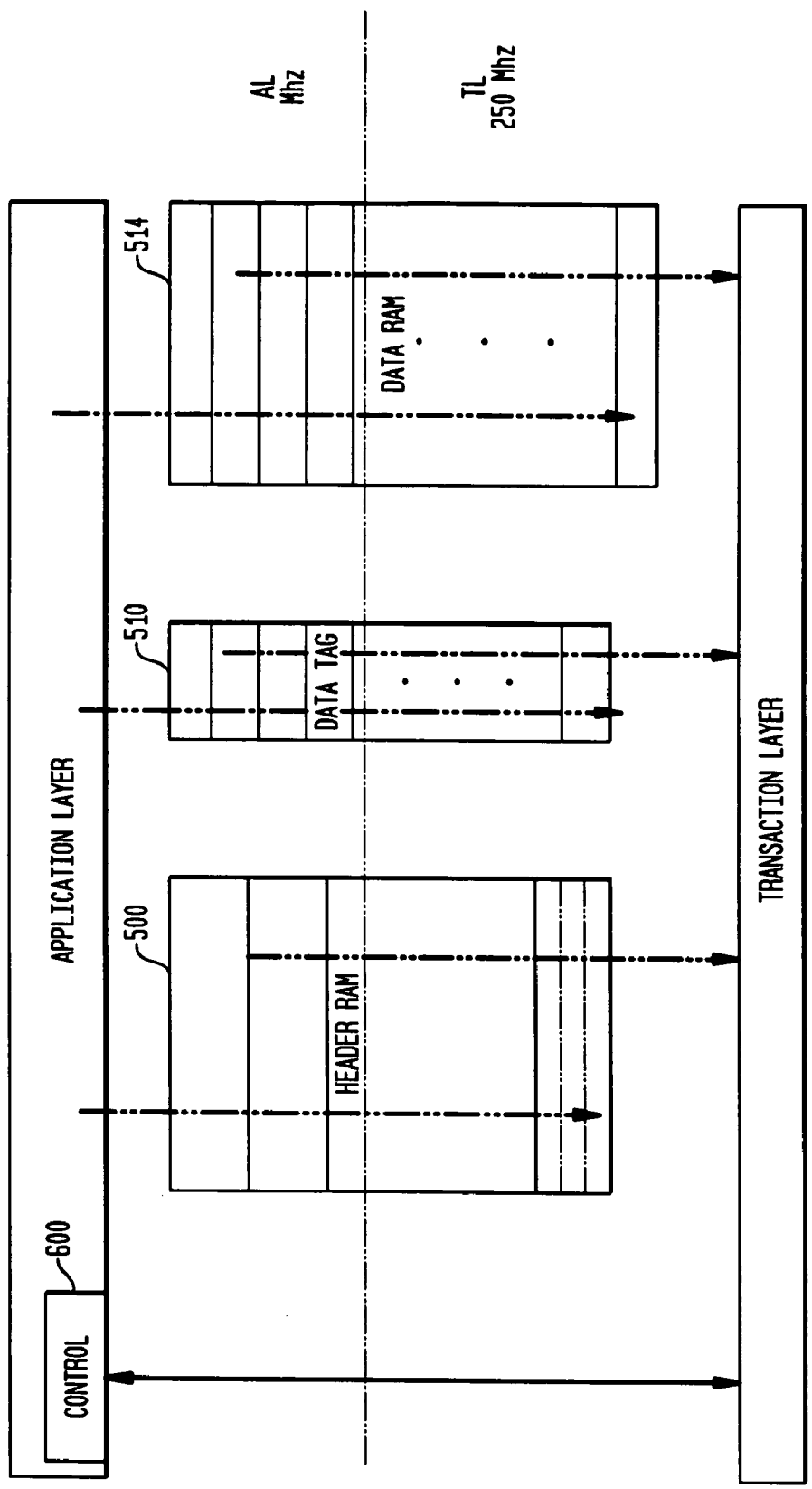
FIG. 6 illustrates the TX and RX buffer structures between the application layer AL and the transaction layer TL.

FIG. 6 illustrates the TX and RX buffer structure between the application layer AL and the transaction layer TL wherein control 600 is exercised by and over the Header RAM 500, the Data Tag 510, and the Data RAM 514. The data RAM 514 is a special dual port RAM having a separate write port and separate read port, such that write operations and read operations can be carried on simultaneously in parallel. The application layer AL and the transaction layer TL have different clocks and clock frequencies that run independently of each other, with the TL clock frequency being shown as an exemplary 250 Mhz, such that the write and read operations are conducted at different clock frequencies and can be conducted simultaneously in parallel through the separate write and read ports.

Figure 7:
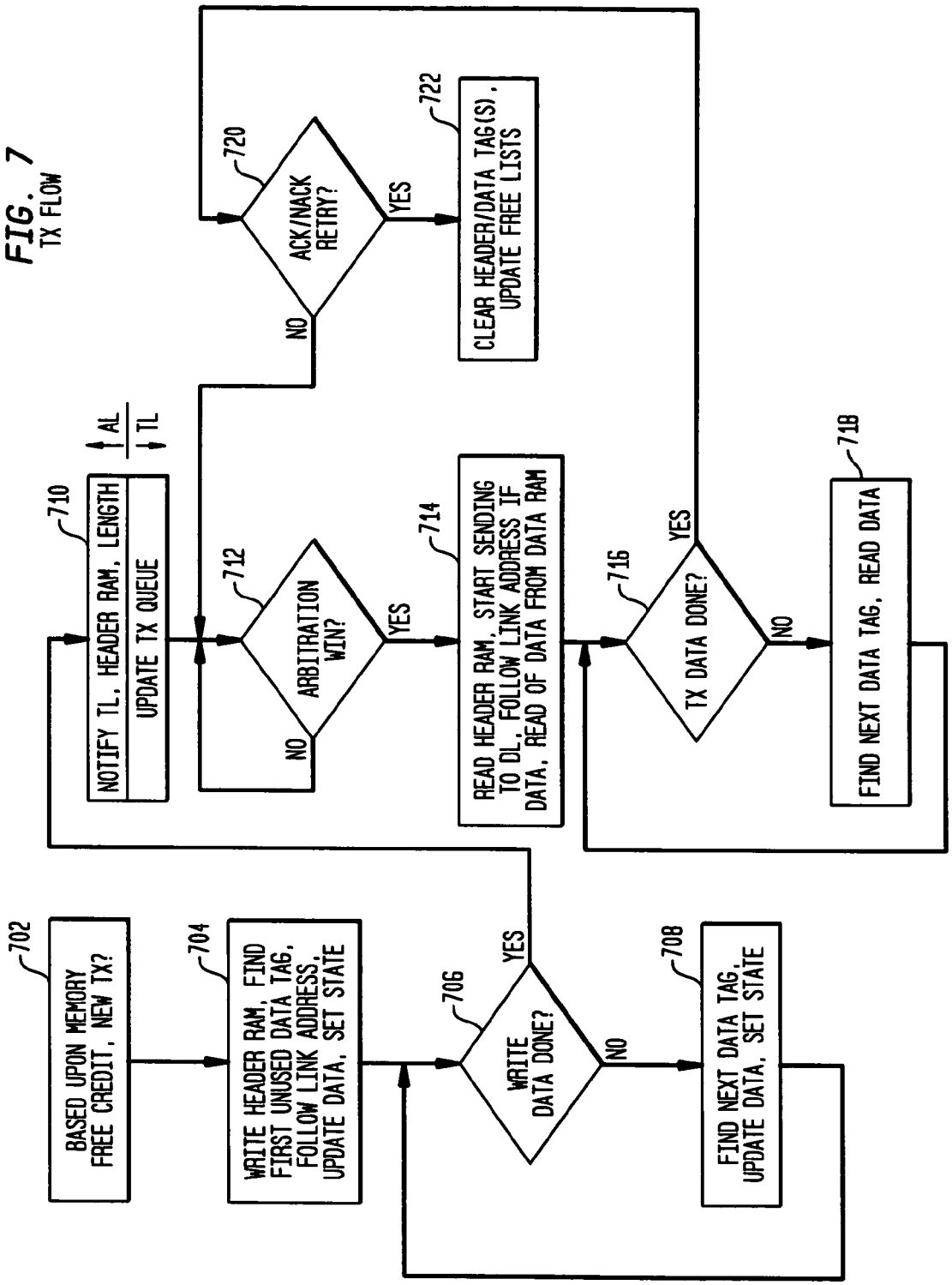
FIG. 7 illustrates a TX logic flow diagram.

FIG. 7 illustrates a TX transaction logic flow diagram. For the TX transaction, the AL enables the TX buffers for a particular transaction, and the TL clears the TX buffers for the transaction. In FIG. 7, steps and blocks from the beginning block 702 to the top half of block 710 are performed by the Application Layer AL, and steps and blocks from the bottom half of block 710 to the end block 722 are performed by the Transaction Layer TL.

At 702, based upon there being available sufficient memory free credit (FIGS. 3 and 5) and that it's a new data TX, at 704 the Application Layer AL writes data describing the data packet transfer/transmission into a data header 502 in the Header RAM 500, and follows the linked address 504 of the data header to find the first unused Data Tag 508, uses the Next Address pointed to (512) in the Data RAM 514 to write/update data in that address, and sets the state (Set State) by updating the Data Tag (e.g. indicating the completed write to the address NA), the Header RAM Free List 516, and the Data RAM Free List 518. At 706, if the write data operation is not finished/done (N), at 708 find the next unused Data Tag 508, and use the Next Address pointed to (512) in the Data RAM 514 to write/update data in that address, and set the state (Set State) by updating the Data Tag and the Data RAM Free List. At 706, if the write data operation is finished/done (Y), at 710 notify the transaction layer TL and the Header RAM 500 that the write data operation is finished (so the transaction layer TL can proceed to read data from the Data RAM to complete the data transfer), and of the length of the data transfer.

At the bottom half of block 710, the Transaction Layer TL updates the TX queue, which maintains track of data packets completed and data packets ready to go. At 712, if there is not an arbitration win (N), which is basically approval to proceed with the data transfer, try again until successful (Y), and at 714, read the data describing the data packet transfer from the data header 502 in the Header RAM 500, start sending the data describing the data packet transfer downstream (to a Data Layer DL), and follow the linked address 504 if data is to be transferred (some transfers are informational only and have no data, and only transfer information in the data header 502) and the Next Address NA and perform a read of the data from the next address in the Data RAM 514. At 716, if the TX data transfer operation is not finished/done (N), then at 718 find the next Data Tag 508 and read the data at the Next Address pointed to (512) in the Data RAM 514. At 716, if the TX data operation is finished/done (Y), at 720 determine if the data packet was successfully received, and if not (N), send a Not acknowledge (Nack) to the Arbitration Win step 712 to retry the transmission of the data packet from the Arbitration Win step 712 in the logic flow diagram. At 720, if the data packet was successfully received (Y), send an Acknowledgement (Ack), and at 722 clear the data describing the data transfer from the data header 502 in the Header RAM 500, the Data Tag(s) 508, and update the Header RAM Free List 516 and the Data RAM Free List 518.

Figure 8:
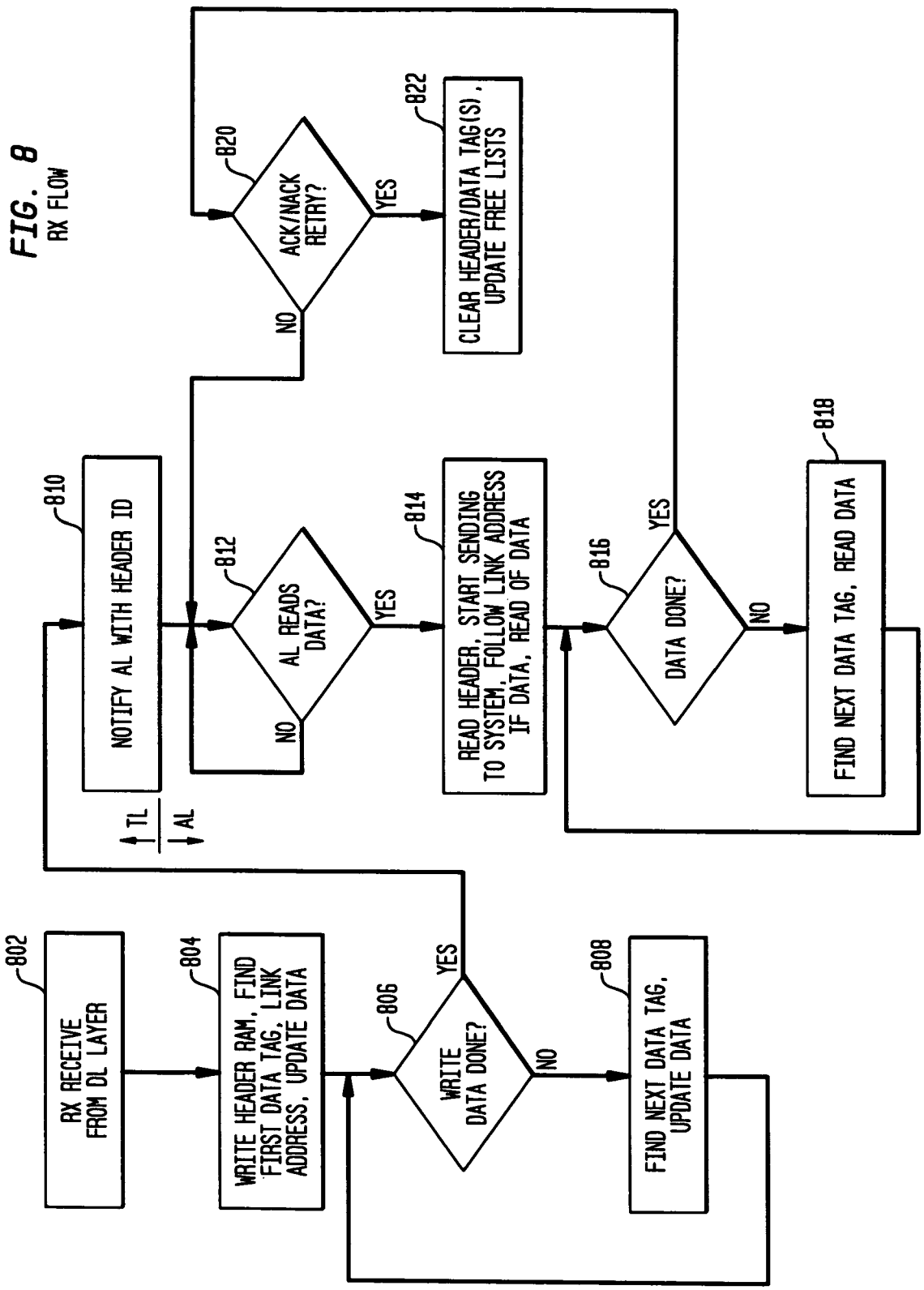
FIG. 8 illustrates a RX logic flow diagram.

FIG. 8 illustrates a RX transaction logic flow diagram. For an RX transaction, the TL enables the RX buffers for a particular transaction, and the AL clears the RX buffers for the transaction. In FIG. 8, steps and blocks from the beginning block 802 to the end of block 810 are performed by the Transaction Layer TL, and steps and blocks after block 810 to the end block 822 are performed by the Application Layer AL.

At 802, the Transaction Layer AL receives data from the Data Layer DL describing the data packet transfer/receive, and at 804 writes the data describing the data packet transfer into a data header 502 in the Header RAM 500, and follows the linked address 504 of the data header to find the first unused Data Tag 508, uses the Next Address pointed to (512) in the Data RAM 514 to write/update data at that address, and sets the state (Set State) by updating the Data Tag (e.g. indicating the completed write/update at the address NA), the Header RAM Free List 516 and the Data RAM Free List 518. At 806, if the write data operation is not finished/done (N), at 808 find the next unused Data Tag 508, and use the Next Address pointed to (512) in the Data RAM 514 to write/update data at that address, and set the state (Set State) by updating the Data Tag and the Data RAM Free List. At 806, if the write data operation is finished/done (Y), at 810 notify the Application layer AL with the Header RAM 500 that the write data operation is finished (so the Application layer AL can proceed to read data from the Data RAM to complete the data transfer), and of the length of the data transfer.

At 812, if there is not an arbitration win or if the Application Layer AL does not read the data (N), which is basically approval to proceed with the data transfer, try again until successful (Y), and at 814, read the data describing the data packet transfer from the data header 502 in the Header RAM 500, start sending the data describing the data packet transfer upstream to the System, and follow the linked address 504 if data is to be transferred (some transfers are informational only and have no data, and only transfer the information in the data header 502) and the Next Address NA and perform a read of the data from the Data RAM 514. At 816, if the RX data transfer operation is not finished/done (N), then at 818 find the next Data Tag 508 and read the data at the Next Address pointed to (512) in the Data RAM 514. At 816, if the RX data operation is finished/done (Y), at 820 determine if the data packet was successfully received, and if not (N), send a Not acknowledge (Nack) to Arbitration Win 812 to retry the transmission of the data packet from the Arbitration Win step 812 in the logic flow diagram. At 820, if the data packet was successfully received (Y), send an Acknowledgement (Ack), and at 722 clear the data describing the data transfer from the data header 502 in the Header RAM 500, the Data Tag(s) 508, and update the Header RAM Free List 516 and the Data RAM Free List 518.

In summary of the TX and RX buffers, the AL/TL buffer structures allow flexible system usage of the TX and RX memory buffers. The Header RAM allows the AL to allocate the number of possible transactions up to its maximum. For an TX transaction, the AL enables the TX buffers for a particular transaction, and the TL clears the TX buffers for the transaction. For an RX transaction, the TL enables the RX buffers for a particular transaction, and the AL clears the RX buffers for the transaction. The design has a similar memory/register file structure for both the RX buffers and TX buffers, which are in fact the same buffers used in both the TX and RX transactions, which reduces design time.

While several embodiments and variations of the present invention for an asynchronous packet based dual port link list header and data credit management structure are described in detail herein, it should be apparent that the disclosures and teachings of the present invention will suggest many alternative designs to those skilled in the art.

The invention claimed is:

1. An asynchronous, data packet based, dual port, data management structure for transferring and managing a plurality of different transfers of packets of data that are being transferred at one time, comprising:
   a multi-port data RAM (random access memory) which stores a plurality of bits of data at a plurality of addresses in the data RAM, the multi-port RAM having a separate write port and a separate read port, such that write operations and read operations can be carried on simultaneously in parallel;
   a data tag buffer including a plurality of data tags to keep track of the locations of the packets of data in the data RAM, wherein each of the data tags includes an address pointing to memory space in the data RAM and each data tag has a free state and a used state; and wherein, when one of the data tags is in the free state, the space in the data RAM pointed to by said one of the data tags, is free; and when said one of the data tags is in the used state, the space in the data RAM pointed to by said one of the data tags is occupied by one of the packets of data;

a header RAM that holds data headers which hold data transfer information and each data header includes a linked address that functions as a pointer to an address of one of the data tags in the data tag buffer;

wherein the data RAM includes a receive (RX) buffer and a transmitter (TX) buffer, and an Application Layer AL communicates with a transaction layer TL by a packet-based protocol through the multi-port data RAM; and the application layer AL and the transaction layer TL have different clocks and clock frequencies mat run independently of each other, and write and read operations are conducted at the different clock frequencies simultaneously in parallel through the separate write port and read port.

2. An asynchronous, data packet based, dual port, data management method for transferring and managing a plurality of different transfers of packets of data that are being transferred at one time, comprising:

storing in a multi-port data RAM (random access memory) a plurality of bits of data at a plurality of addresses in the data RAM, the multi-port RAM having a separate write port and a separate read port, and performing write operations and read operations simultaneously in parallel;

maintaining a plurality of data tags in a data tag to keep track of the locations of the packets of data in the data RAM, wherein each of the data tags includes an address pointing to memory space in the data RAM and each data tag has a free state and a used state; and wherein, when one of the data tags is in the free state, the space in the data RAM pointed to by said one of the data tags, is free; and when said one of the data tags is in the used state, the space in the data RAM pointed to by said one of the data tags is occupied by one of the packets of data;

maintaining in a header RAM data headers which hold data transfer information, wherein and each data header includes a linked address that functions as a pointer to an address of a data tag in the data tag buffer; and wherein said write and read operations are conducted at different clock frequencies simultaneously in parallel through the separate write port and read port;

wherein the data RAM includes a receive (RX) buffer and a transmitter (TX) buffer, and an Application Layer AL communicates with a transaction layer TL by a packet-based protocol through the multi-port data RAM; and wherein the application layer AL and the transaction layer TL have different clocks and clock frequencies that run independently of each other, and said write and read operations at the different clock frequencies of the application layer and the transaction layer.

* * * * *